H. W. HALL.
RAKE.
APPLICATION FILED APR. 25, 1914.

1,128,680.

Patented Feb. 16, 1915.

Witnesses
Seth Johnson
W. A. Heckman

Inventor
Herbert W. Hall
by O. M. Clarke
his attorney

UNITED STATES PATENT OFFICE.

HERBERT W. HALL, OF MONTOUR FALLS, NEW YORK, ASSIGNOR TO THE CRONK & CARRIER MANUFACTURING COMPANY, OF ELMIRA, NEW YORK, A CORPORATION OF NEW YORK.

RAKE.

1,128,680.           Specification of Letters Patent.         Patented Feb. 16, 1915.

Application filed April 25, 1914. Serial No. 834,288.

*To all whom it may concern:*

Be it known that I, HERBERT W. HALL, a citizen of the United States, residing at Montour Falls, in the county of Schuyler and State of New York, have invented certain new and useful Improvements in Rakes, of which the following is a specification.

My invention consists of an improvement in garden and other rakes, and has for its object to provide a strong, durable tool of this class, made entirely of high carbon wrought steel or other suitable metal, and having an operating handle.

The particular feature of improvement is in the construction of the double bowed arms connecting the handle and the rake head, made of continuous pieces of strip or band metal continuously curved and twisted, secured at their outer inwardly turned ends to the rake head, crossed upon each other at the central portion, riveted together, and inserted in the receiving socket of the handle.

The invention is illustrated in the accompanying drawings, in which—

Figure 1:
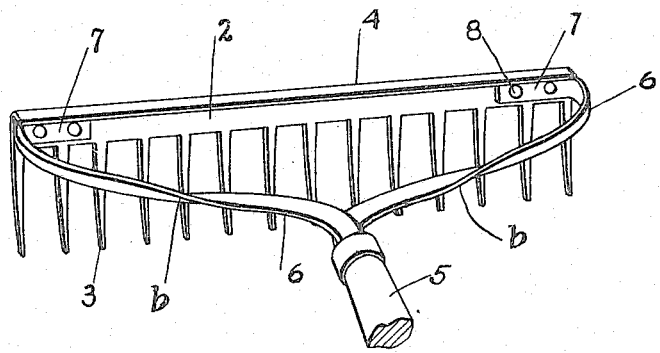
Figure 2:
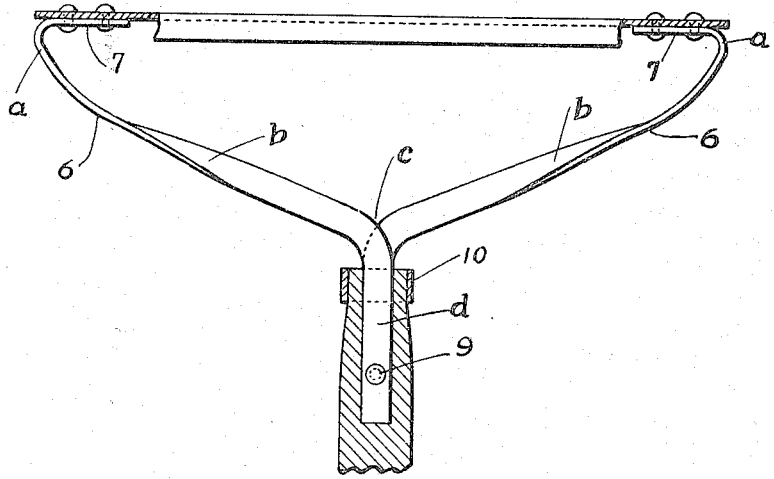
Figure 3:

Figure 1 is a perspective view of the rake. Fig. 2 is a plan view, partly broken away. Fig. 3 is an edge view of the connecting arms.

The head of the rake is preferably punched or sheared out of plate metal and is provided with a continuous transverse head or body portion 2, teeth 3, and an integral top flange 4 providing a continuous rigid construction. The rake head as thus constructed, or otherwise suitably made, is connected with the handle 5 by a pair of bowed arms 6, 6, made of two pieces and socketed in the handle 5 by the inner terminal fixedly connected end portions of said arms. Each arm 6 is provided at its outer end with an inwardly turned terminal 7 laid flatwise against the inner upper portion of the rake head 2 and riveted thereto by rivets 8. The arms are bowed around, as at *a*, the metal strip continuing for a short distance in the same vertical plane or cross section as the terminal 7, and is rounded inwardly toward the central meeting and attaching tang portions, each arm being gradually twisted, as indicated at *b*, whereby to provide a quarter twist in the arms for the major portion of their length inwardly of the backwardly rounded portions *a*. The arms as thus made are arranged flatwise to each other on a plane at right angles to the vertical plane of the end portion 7, and are brought together at the point *c*, and continued backwardly, overlapping each other, and providing a substantial single tang portion *d*, the tang terminals being secured together by one or more rivets 9. The construction of the arms as thus made is rendered extremely stiff, providing against the various strains, either torsional, lateral, vertical, or otherwise, and insuring a strong, rigid construction. The tang terminals *d* being inserted within the end of the handle 5, as indicated, and secured by the usual ferrule 10, provide for a strong substantial connection between the handle and rake.

The advantages of the invention will be appreciated by all those familiar with this class of implements.

The twisted bow arms, by their attachment with the ends of the rake head in the manner shown and described render the rake easily available for use, with a maximum of strength and a minimum of weight.

What I claim is:

1. A rake comprising a head, a handle, and supporting arms therefor consisting of flat bars laid and secured together to provide a doubled straight tang portion, each of said arms diverging edgewise outwardly in opposite directions, being then twisted at right angles to the plane of the tang portions and bowed inwardly and terminating in inwardly turned terminals fixedly secured along the face of the upper end portions of the head.

2. In a rake, the combination of a handle, a bowed frame consisting of two flat bars having inner terminals laid flatwise on each other and riveted together and secured in the end of the handle, diverging therefrom edgewise in opposite directions, twisted one quarter at right angles to the plane of the tang members and bent around to provide rounded portions having inwardly turned terminals, and a rake head having a longitudinal upper portion riveted at each end to said terminals.

In testimony whereof I hereunto affix my signature in the presence of two witnesses.

HERBERT W. HALL.

Witnesses:
HAROLD ABER,
B. D. EDWARDS.

Copies of this patent may be obtained for five cents each, by addressing the "Commissioner of Patents, Washington, D. C."